US008628816B2

(12) United States Patent
Henry et al.

(10) Patent No.: US 8,628,816 B2
(45) Date of Patent: Jan. 14, 2014

(54) PRODUCT TO REDUCE GLYCEMIC RESPONSE OF CARBOHYDRATE BASED FOODS

(75) Inventors: Christiani Jeya Kumar Henry, Oxford (GB); M. Rajendran V. Manickavasagar, Selangor (MY)

(73) Assignee: Holista Biotech Sdn. Bhd., Petaling Jaya (MY)

( * ) Notice: Subject to any disclaimer, the term of this patent is extended or adjusted under 35 U.S.C. 154(b) by 73 days.

(21) Appl. No.: 13/143,332

(22) PCT Filed: Jan. 2, 2009

(86) PCT No.: PCT/MY2009/000001
§ 371 (c)(1),
(2), (4) Date: Aug. 15, 2011

(87) PCT Pub. No.: WO2010/077127
PCT Pub. Date: Jul. 8, 2010

(65) Prior Publication Data
US 2011/0293816 A1    Dec. 1, 2011

(51) Int. Cl.
*A23L 1/29* (2006.01)
*A23L 1/10* (2006.01)
(52) U.S. Cl.
USPC ........... 426/615; 426/618; 426/622; 426/648; 426/650

(58) Field of Classification Search
USPC .................. 426/615, 650, 622, 648
See application file for complete search history.

(56) References Cited

U.S. PATENT DOCUMENTS 1,314,332 A * 8/1919 Ashourian ...................... 361/31

FOREIGN PATENT DOCUMENTS

| CN | 101341946 | 1/2009 |
| JP | 11-000128 A | 1/1999 |
| JP | 2006-212025 | 8/2006 |

OTHER PUBLICATIONS

Liu, Fang et al., "Carbohydrate digestion rate of Adzuki bean-rice mixed food in vitro", Zhongguo Shipin Xuebao. 2007, vol. 7, No. 2, pp. 42-47.

* cited by examiner

*Primary Examiner* — Helen F Heggestad
(74) *Attorney, Agent, or Firm* — Maschoff Brennan

(57) ABSTRACT

The invention relates to the use of flour containing a mixture of pulverized edible parts of Okra plant species, *Vigna* plant species and one or more types of food based carbohydrates selected from cereals or non-cereals or a mixture thereof, for the preparation of a food for altered glycemic response.

20 Claims, 1 Drawing Sheet

PRODUCT TO REDUCE GLYCEMIC RESPONSE OF CARBOHYDRATE BASED FOODS

FIELD OF INVENTION

This invention relates to a pre-mixed flour containing carbohydrate rich source of edible parts of plants to lower the glycemic response in humans when the mixture is incorporated into any carbohydrate based food.

BACKGROUND OF INVENTION

The excessive consumption of refined grains and grain extracts has been reported to increase blood sugar and deteriorate glucose tolerance. The inability of the human body to maintain normal glucose levels or to require excessive levels of insulin to do so has been called glucose intolerance, impaired glucose tolerance and insulin resistance. Insulin resistance is a condition in which the body insulin receptors are insensitive to insulin. These conditions are associated with obesity and may be preliminary steps in the progression to type-2 diabetes mellitus. It has also been linked to alteration in blood lipid and part of a wide syndrome of metabolic disorders called "Syndrome X".

The Glycemic Index or GI is a measure of the effects of carbohydrates on blood glucose levels. It can be used, in conjunction with information about food composition, to guide food choices. Carbohydrates that break down rapidly during digestion releasing glucose rapidly into the bloodstream have a high GI; carbohydrates that break down slowly, releasing glucose gradually into the bloodstream, have a low GI. Foods with a low GI have significant health benefits. The concept was developed by Dr. David J. Jenkins and colleagues in 1980-1981 at the University of Toronto in their research to find out which foods were best for people with diabetes. A lower GI suggests slower rates of digestion and absorption of the sugars and starches in the foods. The GI of a food is defined by the Area Under the Blood Glucose Response Curve (AUC) following the ingestion of a fixed portion of carbohydrate (usually 50 g). The AUC of the test food is divided by the AUC of a standard (either glucose or white bread, giving two different definitions) and multiplied by 100.

For practical application, the GI is useful to rank foods by developing exchange lists of categories of low glycemic index foods, such as legumes, pearled barley, lightly refined grains (e.g. whole grain pumpernickel bread, or breads made from coarse flour), pasta, etc. Specific local foods could be included in such lists where information is available (e.g. green bananas in the Caribbean and specific rice varieties in Southeast Asia).

The current validated methods use glucose as the reference food, giving it a GI value of 100 by definition. This has the advantage that it is universal and it results in maximum GI values of approximately 100. White bread can also be used as a reference food, giving a different set of GI values. A low GI food will release glucose more slowly and steadily. A high GI food causes a more rapid rise in blood glucose levels and is suitable for energy recovery after endurance exercise or for a person with diabetes experiencing low blood sugar. The glycemic effect of food depends on a number of factors, such as the type of starch (amylose vs. amylopectin), physical entrapment of the starch molecules within the food, fat and protein content of the food and organic acids or their salts in the meal. Adding vinegar, for example, will lower the GI. The presence of fat or soluble dietary fibers can slow the gastric emptying rate thus lowering the GI. Unrefined breads with higher amounts of fiber generally have a lower GI value than white breads. Many brown breads, however, are treated with enzymes to soften the crust, which makes the starch more accessible and thus more acceptable to consumers. This raises the GI, with some brown breads even having GI values over 100.

Meals containing low GI foods reduce both postprandial blood glucose and insulin responses. Animal studies suggest that incorporating slowly digested starch into the diet delays the onset of insulin resistance. Some epidemiologic studies suggest that a low GI diet is associated with reduced risk of developing non-insulin diabetes in men and women. Clinical trials in normal, diabetic and hyperlipidemic subjects show that low GI diets reduce mean blood glucose concentrations, reduce insulin secretion and reduce serum triglycerides in individuals with hypertriglyceridemia.

Okra is occasionally referred to by the synonym, *Abelmoschus esculentus* L. or formerly known as *Hibiscus esculentus*. It is commonly consumed as vegetable and is often called lady's finger. Urad, also referred to as urad dhal, urd bean, urd, urid, black matpe bean, black gram, or white lentil (*Vigna mungo*), is a bean grown in southern Asia.

Patent number DE202004017554U discloses an antidiabetic dietetic nutritional supplement comprising processed *Hibiscus* species plant material. Independent claims are also included for aqueous preparations obtained by boiling fresh okra provided in unit packaging with indication of suitability for therapy of diabetes diseases. The unit packaging also contains the processed plant material. The disadvantages of the invention can be seen in the aqueous form of the supplement in which the taste and colour of Okra makes the dietetic nutritional supplement not suitable for daily consumption.

The present invention discloses a preparation of pre-mixed flour consisting edible Okra plant in combination with carbohydrate rich cereal and carbohydrate based food to reduce the glycemic index (GI) of carbohydrate based food which shows significant GI value after consumption. A ready to eat mixture of edible Okra plant and carbohydrate rich cereal incorporated in human daily diet could comply to the needs and current trend for consumption of organic based supplementary products. One of the problems in producing a GI reducing food is the preparation of food which is acceptable for personal consumption in respect of taste, texture, colour and aroma. If any of these characteristics are unacceptable, then the food preparation likely is not well received by the public. The present invention has been prepared for daily consumption and is suitable for human of all age group.

SUMMARY OF THE INVENTION

The invention relates to the use of a pre-mixed flour containing mixture of pulverized edible parts of edible Okra plant species with pulverized edible parts of edible Vigna plant species and one or more types of food based carbohydrate selected from cereals or non-cereals or a mixture of both, for the preparation of food to reduce glycemic response of humans who consume the food.

*Chappati is an unleavened thin and round Indian bread made of wheat flour.

Figure 2:
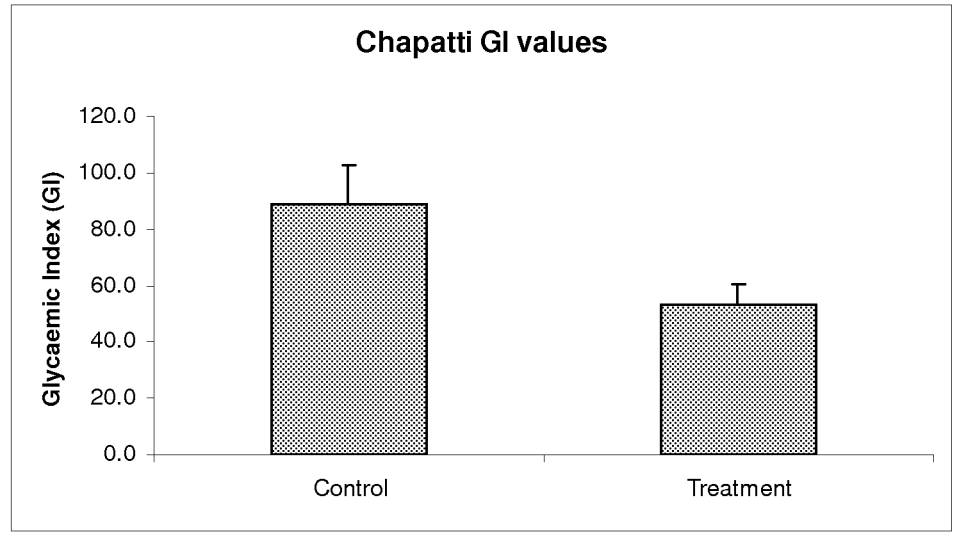

FIG. 2 shows the comparison between the GI value of Chapatti with Okra and Urad dhal (treatment) and Chapatti without the formulation (Control). The GI value for the controlled chapatti is almost 90.0 and the GI for the formulated chapatti is 50.0.

DETAILED DESCRIPTION OF PREFERRED EMBODIMENTS

The Okra seeds and pods as well as Urad dhal contain mainly polysaccharides comprising sugars such as galactose, galactomannan, rhamnose and galacturonic acid. The presence of galactomannan in edible and non-edible Okra plant contributes to the mucilage in its fruits. The mucilage in edible Okra plant is one of the important factor in reducing the GI in carbohydrate based food.

The glycemic index is defined as the Incremental Area Under The Blood Glucose Response Curve ($\Delta IAUC_{food}$) of a 50 g carbohydrate portion of a test food expressed as a percent of the response to the same amount of carbohydrate from a standard food taken by the same subject.

The invention relates to the use of pulverized edible parts of edible Okra plant, especially the fruit in combination with pulverized edible parts of edible Urad (*Vigna*) plant species especially the seed or the pod or a mixture of both by incorporating into food based carbohydrate selected from cereal based foods and non-cereal based foods. The Okra plant used in the invention belongs to one or more types of the commonly edible Abelmoschus species such as *Abelmoschus esculentus* and *Abelmoschus caillei*, in combination with Urad dhal or black gram (*Vigna mango*) or other types of edible Vigna species such as green gram (*Vigna radiata*) and red bean (*Vigna angularis*). The edible parts of edible Okra plant preferably the fruit and seed which has been either sun-dried or oven-dried are pulverized to form its flour. Similar to Okra, the edible parts of edible Urad plant preferably the leguminous pod and seed or commonly called as dhal is sun-dried or oven-dried and will be deskinned or skinned before being pulverized to form its flour. The edible Okra flour and edible Urad flour will then be combined with cereal based food such as rice flour, wheat flour and corn flour or with non-cereal based food such as potato, cassava and sago to prepare a pre-mixed flour. The pre-mixed flour will then be a ready-to-cook food such as chappati, bread, pizza, noodles and cake in order to reduce the glycemic response upon consumption. The low glycemic index will reduce the speed at which the blood glucose level will increase and there is consequently no sugar surge which leads to weight gain or increase of blood lipids which in turn leads to high cholesterol and reduction of alertness.

Cereal based flour such as rice flour, corn flour and wheat flour and non-cereal based flour such as potato flour, cassava flour and sago flour which has high glycemic value are added with 1.5% by weight of edible Okra flour in combination with 3% by weight of edible Urad flour. The mixture of pulverized edible parts of edible Okra plant especially the fruit and the pulverized edible parts of edible Urad plant can be prepared separately as an intermediate product which is incorporated with a ready-to-cook cereal based or non-cereal based product. Nevertheless, the food based carbohydrate from cereal based flour should have less than 10% by weight of pulverized edible parts of edible Okra plant in combination of pulverized edible parts of edible Urad dhal flour and food based carbohydrate from non-cereal based flour should have less than 30% by weight of pulverized edible parts of edible Okra plant in combination of pulverized edible parts of edible Urad dhal flour for the preparation of the pre-mixed flour. The carbohydrate based cereal or non-cereal food which incorporates with edible Okra flour and edible Urad dhal flour will minimally change the original taste, aroma, texture and colour of the finished product. The carbohydrate based food used in the embodiment is Chappati which is produced from cereal based flour. Such combination has been used to test the glycemic index of wheat based bread. The formulation has reduced the wheat based food from a GI value of 90 to a GI value of 50.

The average GI value is calculated from data collected in 6 human subjects. Both the standard and test food must contain an equal amount of available carbohydrate. The result gives a relative ranking for each tested food. The 6 human subjects were served with chappati (a carbohydrate based food made of wheat flour) without pulverized edible Okra fruit and pulverized deskinned Urad dhal and were taken as a control study to monitor the Area Under the Blood Glucose Response Curve (AUC) and Glycemic Index (GI) in each individuals. The AUC and GI of the subjects are shown as below in Table 1 and 2.

TABLE 1

| Subject | | | | | | | | |
|---|---|---|---|---|---|---|---|---|
| | 1 | | | 2 | | | 3 | |
| Time (Mins) | Glucose Level (mmol/l) | Deviation | Time (Mins) | Glucose Level (mmol/l) | Deviation | Time (Mins) | Glucose Level (mmol/l) | Deviation |
| 0 | 5.0 | | 0 | 4.9 | | 0 | 5.0 | |
| 15 | 5.2 | 0.2 | 15 | 4.7 | 0.2 | 15 | 5.0 | 0.0 |
| 30 | 6.8 | 1.8 | 30 | 6.6 | 1.7 | 30 | 6.8 | 1.8 |
| 45 | 7.3 | 2.3 | 45 | 6.9 | 2.0 | 45 | 7.9 | 2.9 |
| 60 | 7.2 | 2.2 | 60 | 7.3 | 2.4 | 60 | 8.2 | 3.2 |
| 90 | 5.6 | 0.6 | 90 | 6.8 | 1.9 | 90 | 6.2 | 1.2 |
| 120 | 5.5 | 0.5 | 120 | 5.0 | 0.1 | 120 | 4.3 | 0.7 |
| AUC | | 139.5 | AUC | | 166.7 | AUC | | 171.9 |
| GI | | 72.4 | GI | | 89.0 | GI | | 118.3 |

TABLE 2

| | Subject | | | | | | | |
|---|---|---|---|---|---|---|---|---|
| | 4 | | | 5 | | | 6 | |
| Time (Mins) | Glucose Level (mmol/l) | Deviation | Time (Mins) | Glucose Level (mmol/l) | Deviation | Time (Mins) | Glucose Level (mmol/l) | Deviation |
| 0 | 5.2 | | 0 | 5.1 | | 0 | 5.0 | |
| 15 | 5.5 | 0.3 | 15 | 5.5 | 0.4 | 15 | 4.5 | 0.5 |
| 30 | 6.7 | 1.5 | 30 | 7.4 | 2.3 | 30 | 5.7 | 0.7 |
| 45 | 6.1 | 0.9 | 45 | 7.6 | 2.5 | 45 | 7.1 | 2.1 |
| 60 | 5.3 | 0.1 | 60 | 7.3 | 2.2 | 60 | 7.0 | 2.0 |
| 90 | 5.7 | 0.5 | 90 | 5.1 | 0.0 | 90 | 6.8 | 1.8 |
| 120 | 5.4 | 0.2 | 120 | 5.6 | 0.5 | 120 | 5.9 | 0.9 |
| AUC | | 60.8 | AUC | | 135.0 | AUC | | 152.3 |
| GI | | 43.309 | GI | | 132.5 | GI | | 79.1 |

The AUC of the subjects who consumed chappati without pulverized edible Okra fruit and pulverized deskinned Urad dhal (controlled study) is shown in Table 3.

TABLE 3

| Subject | AUC |
|---|---|
| 1 | 139.5 |
| 2 | 166.7 |
| 3 | 171.9 |
| 4 | 60.8 |
| 5 | 135.0 |
| 6 | 152.3 |
| Mean | 137.7 |
| SD | 40.4 |
| SEM | 16.8 |

Figure 1:
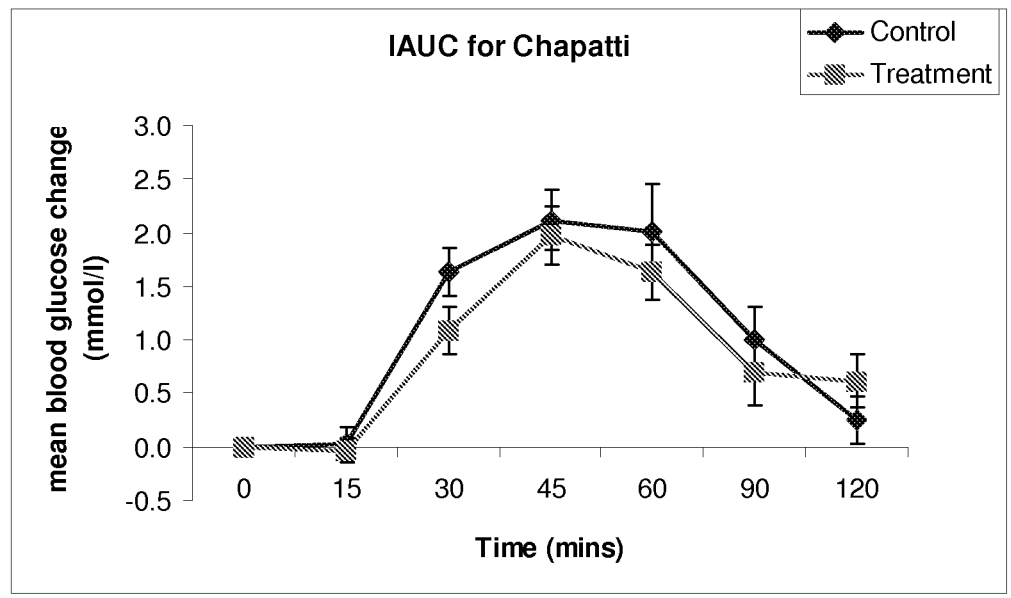
FIG. 1 shows the Incremental Area Under the Blood Glucose Response Curve (IAUC). The curve shows the glycemic response of a typical wheat based food for example, Chapatti* in a controlled meal (without Okra and Urad dhal) and one meal used as treatment containing Okra and Urad dhal. The trial was performed on 6 subjects, according to the protocol from the Food and Agricultural Organization of the United Nations (FAO) The response was monitored for 120 minutes in which the glucose level decreased in the patient after 45 minutes.

The Incremental Area Under the Blood Glucose Response Curve (IAUC) value of the subjects who consumed chappati without pulverized edible Okra fruit and pulverized deskinned Urad dhal (controlled study) is shown in Table 4. The mean value IAUC against time for the controlled study is shown in the graph in FIG. 1.

TABLE 4

Controlled (Chappati without pulverized Urad dhal and pulverized Okra fruit)

| | Subject | | | | | | IAUC | | |
|---|---|---|---|---|---|---|---|---|---|
| Time (mins) | 1 | 2 | 3 | 4 | 5 | 6 | Mean | SD | SE |
| 0 | 0.0 | 0.0 | 0.0 | 0.0 | 0.0 | 0.0 | 0.0 | 0.0 | 0.0 |
| 15 | 0.2 | −0.2 | 0.0 | 0.3 | 0.4 | −0.5 | 0.0 | 0.3 | 0.1 |
| 30 | 1.8 | 1.7 | 1.8 | 1.5 | 2.3 | 0.7 | 1.6 | 0.5 | 0.2 |
| 45 | 2.3 | 2.0 | 2.9 | 0.9 | 2.5 | 2.1 | 2.1 | 0.7 | 0.3 |
| 60 | 2.2 | 2.4 | 3.2 | 0.1 | 2.2 | 2.0 | 2.0 | 1.0 | 0.4 |

TABLE 4-continued

Controlled (Chappati without pulverized Urad dhal and pulverized Okra fruit)

| | Subject | | | | | | IAUC | | |
|---|---|---|---|---|---|---|---|---|---|
| Time (mins) | 1 | 2 | 3 | 4 | 5 | 6 | Mean | SD | SE |
| 90 | 0.6 | 1.9 | 1.2 | 0.5 | 0.0 | 1.8 | 1.0 | 0.8 | 0.3 |
| 120 | 0.5 | 0.1 | −0.7 | 0.2 | 0.5 | 0.9 | 0.3 | 0.5 | 0.2 |

The GI value of the subjects who consumed chappati without pulverized edible Okra fruit and pulverized deskinned Urad dhal (controlled study) is shown in Table 5. The mean value of GI for the controlled study is shown in the graph in FIG. 2.

TABLE 5

| Subject | GI value |
|---|---|
| 1 | 72.4 |
| 2 | 89.0 |
| 3 | 118.3 |
| 4 | 43.3 |
| 5 | 132.5 |
| 6 | 79.1 |
| Mean | 89.1 |
| SD | 32.3 |
| SEM | 13.5 |

After an interval of 2 to 3 days after conducting the controlled study, the same 6 human subjects as used previously were served with chappati added with pulverized edible Okra fruit and pulverized deskinned Urad dhal and were taken as treatment study to monitor the AUC and GI in each individuals. The AUC and GI of the subjects are shown as below in Table 6 and 7.

TABLE 6

| | Subject | | | | | | | |
|---|---|---|---|---|---|---|---|---|
| | 1 | | | 2 | | | 3 | |
| Time (Mins) | Glucose Level (mmol/l) | Deviation | Time (Mins) | Glucose Level (mmol/l) | Deviation | Time (Mins) | Glucose Level (mmol/l) | Deviation |
| 0 | 5.0 | | 0 | 4.9 | | 0 | 5.0 | |
| 15 | 5.2 | 0.2 | 15 | 4.8 | 0.1 | 15 | 5.3 | 0.3 |
| 30 | 5.3 | 0.3 | 30 | 5.9 | 1.0 | 30 | 6.9 | 1.9 |
| 45 | 6.8 | 1.8 | 45 | 6.4 | 1.5 | 45 | 8.3 | 3.3 |

TABLE 6-continued

| | Subject 1 | | | Subject 2 | | | Subject 3 | |
|---|---|---|---|---|---|---|---|---|
| Time (Mins) | Glucose Level (mmol/l) | Deviation | Time (Mins) | Glucose Level (mmol/l) | Deviation | Time (Mins) | Glucose Level (mmol/l) | Deviation |
| 60 | 7.0 | 2.0 | 60 | 5.8 | 0.9 | 60 | 7.3 | 2.3 |
| 90 | 5.7 | 0.7 | 90 | 4.5 | 0.4 | 90 | 6.0 | 1.0 |
| 120 | 5.5 | 0.5 | 120 | 5.3 | 0.4 | 120 | 5.5 | 0.5 |
| AUC | | 108.0 | AUC | | 55.9 | AUC | | 171.8 |
| GI | | 49.8 | GI | | 27.2 | GI | | 82.4 |

TABLE 7

| | Subject 4 | | | Subject 5 | | | Subject 6 | |
|---|---|---|---|---|---|---|---|---|
| Time (Mins) | Glucose Level (mmol/l) | Deviation | Time (Mins) | Glucose Level (mmol/l) | Deviation | Time (Mins) | Glucose Level (mmol/l) | Deviation |
| 0 | 5.3 | | 0 | 4.9 | | 0 | 5.0 | |
| 15 | 5.3 | 0.0 | 15 | 4.5 | 0.4 | 15 | 4.8 | 0.2 |
| 30 | 6.5 | 1.2 | 30 | 5.7 | 0.8 | 30 | 6.3 | 1.3 |
| 45 | 7.1 | 1.8 | 45 | 6.6 | 1.7 | 45 | 6.8 | 1.8 |
| 60 | 6.6 | 1.3 | 60 | 6.0 | 1.1 | 60 | 7.2 | 2.2 |
| 90 | 5.8 | 0.5 | 90 | 5.4 | 0.5 | 90 | 6.9 | 1.9 |
| 120 | 6.3 | 1.0 | 120 | 4.7 | 0.2 | 120 | 6.5 | 1.5 |
| AUC | | 104.3 | AUC | | 73.1 | AUC | | 174.2 |
| GI | | 54.1 | GI | | 50.3 | GI | | 55.4 |

The AUC of the subjects who consumed chappati with pulverized edible Okra fruit and pulverized deskinned Urad dhal (controlled study) is shown in Table 8.

TABLE 8

| Subject | AUC |
|---|---|
| 1 | 108.0 |
| 2 | 55.9 |
| 3 | 171.8 |
| 4 | 104.3 |
| 5 | 73.1 |
| 6 | 174.2 |
| Mean | 114.5 |
| SD | 49.3 |
| SEM | 15.6 |

The Incremental Area Under the Blood Glucose Response Curve (IAUC) value of the subjects who consumed chappati with pulverized edible Okra fruit and pulverized deskinned Urad dhal (treatment study) is shown in Table 9. The mean value of IAUC against time for the treatment study is also shown in the graph in FIG. 1.

TABLE 9

Treatment (Chappati with pulverized Urad dhal and pulverized Okra fruit)

| | Subject | | | | | | IAUC | | |
|---|---|---|---|---|---|---|---|---|---|
| Time (mins) | 1 | 2 | 3 | 4 | 5 | 6 | mean | SD | SE |
| 0 | 0.0 | 0.0 | 0.0 | 0.0 | 0.0 | 0.0 | 0.0 | 0.0 | 0.0 |
| 15 | 0.2 | −0.1 | 0.3 | 0.0 | −0.4 | −0.2 | 0.0 | 0.3 | 0.1 |
| 30 | 0.3 | 1.0 | 1.9 | 1.2 | 0.8 | 1.3 | 1.1 | 0.5 | 0.2 |
| 45 | 1.8 | 1.5 | 3.3 | 1.8 | 1.7 | 1.8 | 2.0 | 0.7 | 0.3 |
| 60 | 2.0 | 0.9 | 2.3 | 1.3 | 1.1 | 2.2 | 1.6 | 0.6 | 0.3 |
| 90 | 0.7 | −0.4 | 1.0 | 0.5 | 0.5 | 1.9 | 0.7 | 0.8 | 0.3 |
| 120 | 0.5 | 0.4 | 0.5 | 1.0 | −0.2 | 1.5 | 0.6 | 0.6 | 0.2 |

The GI value of the subjects who consumed chappati added with pulverized edible Okra fruit and pulverized deskinned Urad dhal (treatment study) are shown in Table 10. The mean value of GI for the treatment study is shown in the graph in FIG. 2.

TABLE 10

| Subject | GI value |
|---|---|
| 1 | 49.8 |
| 2 | 27.2 |
| 3 | 82.4 |
| 4 | 54.1 |
| 5 | 50.3 |
| 6 | 55.4 |
| Mean | 53.2 |
| SD | 17.6 |
| SEM | 7.3 |

The study was conducted in using chapatti, a carbohydrate based food made of wheat flour. Besides that, the pulverized edible part of Okra plant and edible part of *Vigna* plant species can also be added into carbohydrate based food such as bread, cake, pizza and noodles selected from cereal or non-cereal based plant source.

The invention claimed is:

1. A process for preparation of food, the process comprising:
    using a pre-mixed flour containing mixture of pulverized edible parts of edible Okra plant species with pulverized edible parts of edible *Vigna* plant species and one or more types of food based carbohydrate selected from cereals or non-cereals or a mixture of both, for the preparation of food to reduce glycemic response of humans who consume the food, containing pulverized edible parts of edible Okra plant species in combination with pulverized edible part of edible *Vigna* plant species, wherein the edible Okra plant species is present in an amount that is less than 10% by weight.

2. The process as claimed in claim 1 wherein the pulverized edible parts of edible Okra plant species is fruit.

3. Food prepared from the pre-mixed flour as claimed in claim 2.

4. The process as claimed in claim 1 wherein the pulverized edible Okra plant species is *Abelmoschus esculentus* or *Abelmoschus caillei* or a mixture of two or more.

5. Food prepared from the pre-mixed flour as claimed in claim 4.

6. The process as claimed in claim 1 wherein the pulverized edible *Vigna* plant species is *Vigna mungo, Vigna radiata* or *Vigna angularis* or a mixture of two or more.

7. Food prepared from the pre-mixed flour as claimed in claim 6.

8. The process as claimed in claim 1 wherein the pulverized edible parts of *Vigna* plant species are pods or seeds or any combination thereof.

9. Food prepared from the pre-mixed flour as claimed in claim 8.

10. The process as claimed in claim 8 wherein the seeds are deskinned.

11. Food prepared from the pre-mixed flour as claimed in claim 10.

12. A ready-to-cook food made from pre-mixed flour as claimed in claim 1.

13. Food prepared from the pre-mixed flour as claimed in claim 12.

14. Food prepared from the pre-mixed flour as claimed in claim 1.

15. A process for preparation of pre-mixed flour, the process comprising:
    using a mixture of pulverized fruits of edible Okra plant species selected from *Abelmoschus esculentus* or *Abelmoschus caillei* or a mixture of both or more, and pulverized seeds of edible *Vigna* plant species selected from *Vigna mungo* or *Vigna radiata* or *Vigna angularis* or a mixture of two or more, and wheat flour in preparation of a pre-mixed flour utilized in preparation of food to reduce glycemic response of humans who consume the food, containing pulverized edible parts of edible Okra plant species in combination with pulverized edible part of edible *Vigna* plant species, wherein the edible Okra plant species is present in an amount that is less than 10% by weight.

16. Food prepared from the pre-mixed flour as claimed in claim 15.

17. A pre-mixed flour for preparation of food to reduce glycemic response of humans who consume the food which pre-mixed flour includes pulverized fruits of edible Okra plant species selected from *Abelmoschus esculentus* or *Abelmoschus caillei* or a mixture of two, and pulverized seeds of edible *Vigna* plant species selected from *Vigna munga* or *Vigna radiata* or *Vigna angularis* or a mixture of two or more, and food based carbohydrate, containing pulverized edible parts of edible Okra plant species in combination with pulverized edible part of edible *Vigna* plant species, wherein the edible Okra plant species is present in an amount that is less than 10% by weight.

18. Food prepared from the pre-mixed flour as claimed in claim 17.

19. A preparation of a mixture of at least 1.5% by weight of pulverized fruits of edible Okra plant species selected from *Abelmoschus esculentus* or *Abelmoschus caillei* or a combination of two, and at least 3% by weight of pulverized seeds of edible *Vigna* plant species selected from *Vigna mungo* or *Vigna radiata* or *Vigna angularis* or a combination of two or more, wherein the mixture is separately used as an intermediate product incorporated into a carbohydrate based flour to produce a ready-to-cook food, containing pulverized edible parts of edible Okra plant species in combination with pulverized edible part of edible *Vigna* plant species, wherein the edible Okra plant species is present in an amount that is less than 10% by weight.

20. Food prepared from the pre-mixed flour as claimed in claim 19.

* * * * *

UNITED STATES PATENT AND TRADEMARK OFFICE
CERTIFICATE OF CORRECTION

PATENT NO.       : 8,628,816 B2                                                                Page 1 of 1
APPLICATION NO.  : 13/143332
DATED            : January 14, 2014
INVENTOR(S)      : Henry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 113 days.

Signed and Sealed this
Twenty-second Day of September, 2015

Michelle K. Lee
*Director of the United States Patent and Trademark Office*